United States Patent [19]

Lawassani et al.

[11] Patent Number: 5,059,016

[45] Date of Patent: Oct. 22, 1991

[54] VANITY MIRROR ASSEMBLY

[75] Inventors: Abdi Lawassani, Pontiac; Robert C. Feliks, Troy, both of Mich.

[73] Assignee: United Technologies Automotive, Dearborne, Mich.

[21] Appl. No.: 564,904

[22] Filed: Aug. 9, 1990

[51] Int. Cl.[5] .............................................. G02B 7/18
[52] U.S. Cl. .................................. 359/871; 248/466; 296/97.5; 359/844
[58] Field of Search ............... 350/606, 631; 248/466; 296/97.5; 362/83.1, 135, 136

[56] References Cited

U.S. PATENT DOCUMENTS 4,275,913 6/1981 Marcus ................................. 296/97.5
4,796,944 1/1989 Lobanoff et al. ................... 296/97.5
4,981,348 1/1991 Prillard ............................... 296/97.5

Primary Examiner—Bruce Y. Arnold
Assistant Examiner—J. P. Ryan
Attorney, Agent, or Firm—Troxell K. Snyder

[57] ABSTRACT

A vanity mirror assembly has a protective cover (7) which pivots with respect to a mirror frame (6) by virtue of a hinge arrangement consisting of a pivot arm (8), attached to the cover (7), snap-fitted to a pivot axle 14, attached to the frame (6). The cover (7) can be positioned and held in either a closed position, totally covering the mirror, or in one or more predetermined open positions. The cover is held in place by a band-type spring acting against a cam surface located on the pivot arm (8).

6 Claims, 2 Drawing Sheets

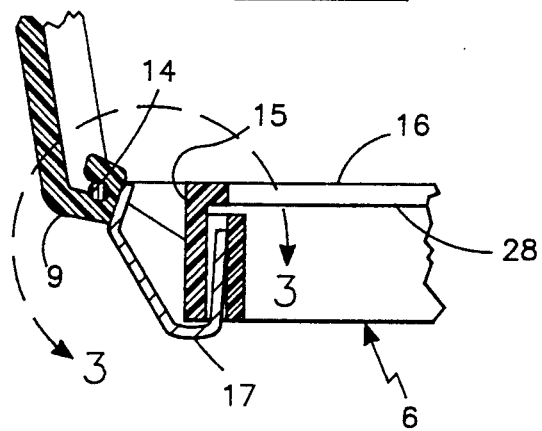
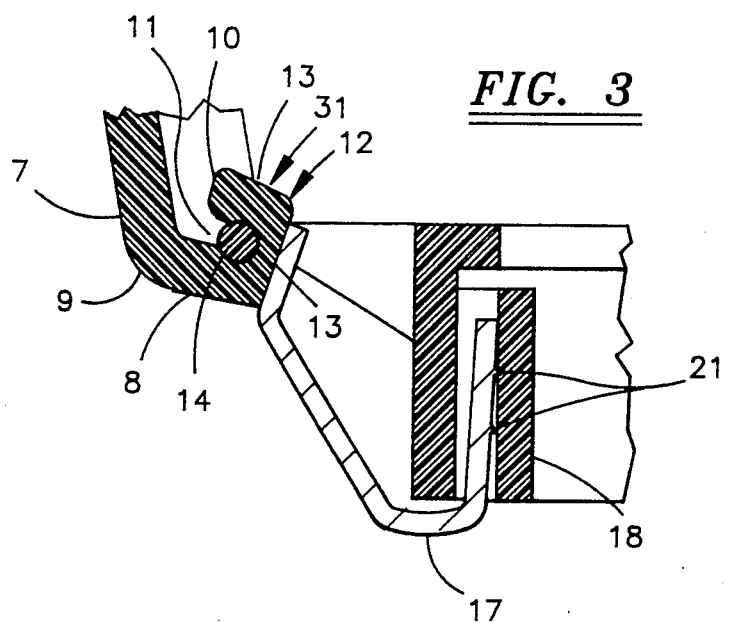
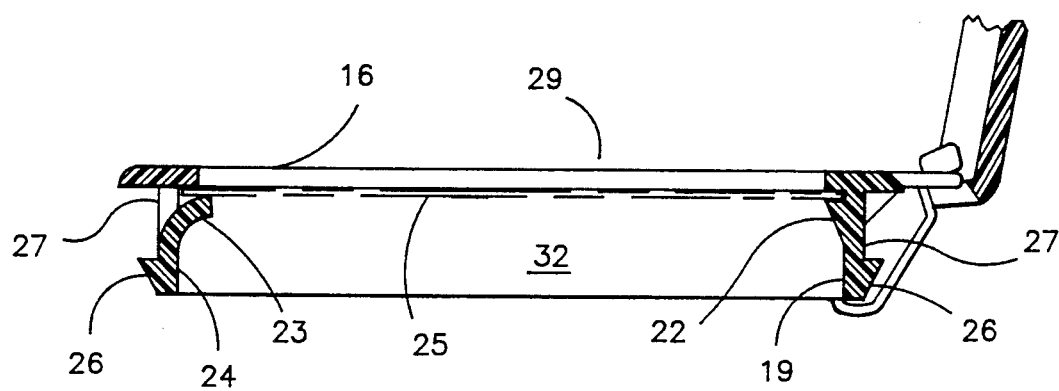

VANITY MIRROR ASSEMBLY

DESCRIPTION

1. Technical Field

This invention relates to a vanity mirror assembly and more particularly to a vanity mirror assembly with a protective cover.

2. Background Art

Vanity mirrors have become a popular accessory item in many vehicles. Commonly attached to the vehicle's sun visor, vanity mirrors have evolved from simple clip-on type mirrors to modern vanity mirror assemblies housed within the sun visor. Modern vanity mirror assemblies commonly include a cover which both protects and conceals the mirror when not in use. Some of these assemblies employ a coil spring attached to the mirror frame to hold the cover in either a closed or open position. Other modern vanity mirror assemblies have proposed using an "L" or a "T" shaped leaf spring in combination with a camming means to hold the cover either open or closed. Leaf spring assemblies most frequently require both a tab to attach the spring to the frame and a flat surface for the spring to act on. Disadvantages of this type design include the tolerancing involved with the tab. If the tab is to hold the spring in place, the tab and the corresponding hole in the spring must be a relatively close slide fit. This makes the manufacturing of both the mirror frame and the spring more expensive. Furthermore, the flat surface required by either leaf spring configuration makes the whole design bulkier and harder to incorporate into small sun visors.

A large number of the vanity mirror assemblies that exist presently employ screws, clips, or both to attach the assembly in place in the visor. Typically, holes are placed in the mirror assembly and corresponding bosses are positioned in the mating sun visor to accept self tapping screws. Two disadvantages of this means of attachment are the expense of additional hardware and the extra time required for assembly.

Similarly, some existing mirror assemblies employ screws, clips, or both to attach the mirror to the mirror frame. The disadvantages, again, are the expense of additional hardware and the extra time required for assembly.

DISCLOSURE OF INVENTION

Objects of the invention include improvements in a vanity mirror assembly.

According to one aspect of the present invention, a vanity mirror assembly is provided with a cover which can be attached on one edge of a mirror frame and pivoted about that edge. The cover can be positioned and held either in a closed position, totally covering the mirror, or in one or more predetermined open positions. The positioning of the cover, closed or otherwise, is accomplished by a cam, attached to either the cover or the mirror frame, acting against a spring attached to either the mirror frame or the cover. For example, the cover may include pivot arms which can be snap-fitted over pivot axles attached to the mirror frame thereby connecting the frame and the mirror. The hinge arrangement formed by the pivot arms and axles permits the cover to be pivoted about the pivot axles. The pivot arms may also include cam surfaces which a "U" shaped band-type spring can press against. One arm of the spring presses against a flat section of the cam surface and holds the cover in position. The other arm is received within a cored boss formed on the mirror frame, thereby attaching the spring to the frame.

The advantages of this type cam-band spring arrangement include greater allowable tolerance variations for all mating parts. For instance, because of the nature of the band-type spring, the core within the boss can have relatively large tolerance variations. As a result, the frame can be manufactured more economically. Moreover, assembly of the entire unit is facilitated. The cam-band spring arrangement is also compact and easily placed within a sun visor.

According to another aspect of the present invention, the vanity mirror assembly includes a means to attach the mirror to the assembly's mirror frame. For example the mirror frame may have tabs which can be bent to allow the mirror to be pushed past thereby attaching the mirror to the mirror frame. The advantages to this type construction include the ability to attach the mirror in a single step with no separate mounting hardware required.

According to another aspect of the present invention, the vanity mirror assembly includes the means to attach the assembly to a mating part. For instance, the mirror frame of the vanity mirror assembly may contain tabs which allow the assembly to snap fit into a mating part, such as a sun visor. The advantages of this type construction include being able to mount the assembly in a single step with no separate mounting hardware required.

The foregoing and other objects, features, and advantages of the present invention will become more apparent in light of the following detailed description of exemplary embodiments thereof, as illustrated in the accompanying drawings.

BRIEF DESCRIPTION OF DRAWINGS

FIG. 2 is a sectional view of the pivot socket as indicated in FIG. 1.

FIG. 3 is an enlargement of the sectional view in FIG. 2 showing the pivot arm, pivot axle, and spring in greater detail.

FIG. 4 is a sectional view detailing the tab arrangement for both holding the mirror in place and securing the vanity mirror assembly to the sun visor. The mirror is shown in phantom.

BEST MODE FOR CARRYING OUT THE INVENTION

Figure 1:
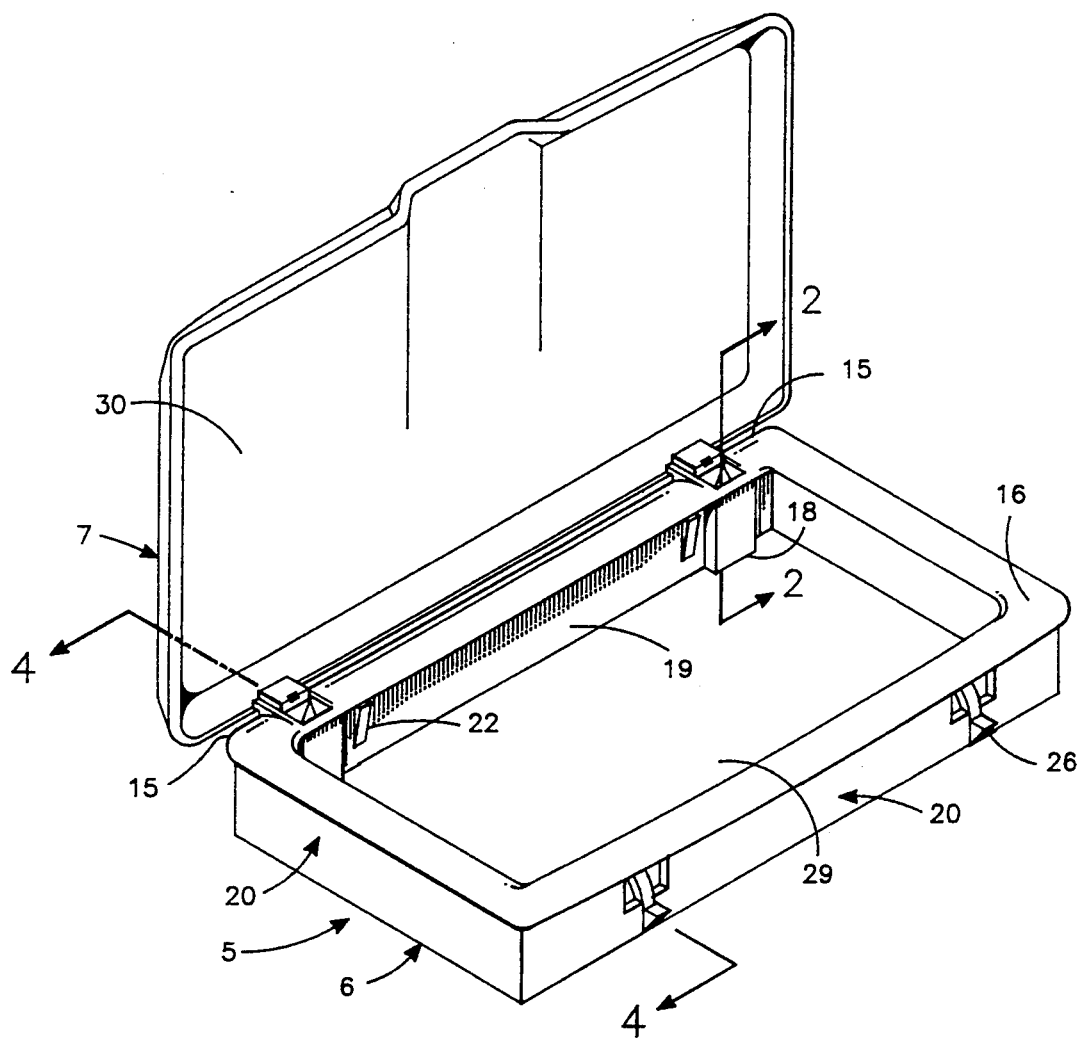
FIG. 1 is an isometric view of the vanity mirror assembly. The mirror is not shown in this figure.

Referring now to FIG. 1, FIG. 2, and FIG. 3, the vanity mirror assembly 5 includes a mirror frame 6 and a protective cover 7. The protective cover 7 includes pivot arms 8 which are integrally formed and attached to the cover 7 near the bottom edge 9. The pivot arms 8 have an interior surface 10 which includes a semi-circular open socket 11 facing in the direction of the cover 7. The exterior surface 31 of the pivot arms 8 comprises a cam surface 12 with two defined flats 13.

The mirror frame 6 includes two circular pivot axles 14 which are integrally formed and attached to the top edge 15 of the mirror frame 6 such that the center axis of the pivot axles 14 is parallel with the top edge 15 of the mirror frame 6. The axles are positioned outboard of the top edge 15, such that an edge of the axles 14 is flush with the plane of the face 16 of the mirror frame 6. The mirror frame 6 is attached to the cover 7 by snap-fitting the semi-circular open sockets 11 over the pivot axles 14. By partially circumscribing the pivot axle 14, the pivot arm 8 forms a hinge arrangement with the axle 14 which allows the cover 7 to pivot with respect to the frame 6.

At each hinge arrangement, one arm of a "U" shaped band-type spring 17 presses against a cam surface 12 of the pivot arm 8. The cover 7 is held in position, closed or otherwise, when the band spring 17 presses against a flat section 13 of the cam surface 12. The other arm of the spring 17 is received within a cored boss 18 attached to the interior side 19 of a frame wall 20. The frame walls 20 extend out at a right angle from the surface 28 opposite the frame face 16. The walls surround a central opening 29 in the face 16 of the frame 6. The cored bosses are located along the top edge 15 of the mirror frame 6 extend lengthwise in a right angle in to the face 16 of the frame 6. The centerlines of the bosses 18 are positioned along the length of the frame wall 20 to coincide with the centerlines of the pivot axles 14 and arms 8.

Referring to FIG. 4, the mirror frame 6 includes both spaced fixed interior tabs 22 extending out from the interior surface 19 of the frame wall 20, and spaced pliable tabs 23 extending out from the interior surface 24 of the frame wall 20 opposite the interior surface 19 which includes the fixed interior tabs 22. The pliable tabs 23 may also extend out of interior surfaces 32 adjacent to the interior surface 19 which includes the fixed interior tabs 22. These tabs hold a mirror 25 within the mirror frame 6 when one side of the mirror 25 is inserted above the fixed interior tabs 22 and the other side is pushed past the pliable tabs 23 in the direction of the frame face 16. Once the mirror 25 is past, the pliable tabs 23 extend behind the mirror 25 thereby holding the mirror 25 in place.

The entire mirror frame assembly 5 is attached to the sum visor (not shown) by spaced fixed exterior tabs 26 extending out from the exterior surfaces 27 of the frame walls 20.

We claim:

1. An vanity mirror assembly comprising:
   a mirror frame, including a plurality of circular pivot axles secured to one side of said frame, wherein the central axis of said axles is parallel to the one side of said frame, and a plurality of cored bosses secured to the one side and located incident with the axles;
   a protective cover, including a plurality of pivot arms attached to one edge of said cover, wherein said arms each include a semi-circular open socket for receiving a corresponding axle therein, and a cam surface; and
   a plurality of "U" shaped band-type springs, one arm of each spring being received in one of said cored bosses, and wherein the other arm of each spring presses against the cam surface of the coincident pivot arm.

2. The mirror assembly according to claim 1 wherein each of the cam surfaces includes a flat section.

3. A vanity mirror assembly comprising:
   a mirror frame, including a plurality of circular pivot axles secured to one side of said frame, wherein the central axis of said axles is parallel to the one side of said frame, and a plurality of cored bosses secured to the one side and located coincident with the axles;
   a protective cover, including a plurality of pivot arms attached to one edge of said cover, wherein said arms each include a semi-circular open socket for receiving a corresponding axle therein, and a cam surface; and
   a plurality of "U" shaped band-type springs, each spring including means for attaching said band type spring
   including a barb on the portion of the one arm of the band-type spring received within the cored boss, and wherein the other arm of each spring presses against the cam surface of the corresponding pivot arm.

4. The mirror assembly according to claim 3 wherein the means for attaching the mirror further includes:
   a plurality of pliable tabs extending out from a third interior wall adjacent to the first interior wall.

5. A vanity mirror assembly comprising:
   a mirror frame, including a plurality of circular pivot axles secured to one side of said frame wherein the central axis of said axles is parallel to the one side of said frame, and a plurality of cored bosses secured to the one side and located coincident with the axles, said mirror frame further including a means for attaching the mirror to said mirror frame including a plurality of fixed exterior tabs extending out from a first interior mirror frame wall and a plurality of spaced pliable tabs extending out from a second interior wall opposite the first interior wall;
   a protective cover, including a plurality of pivot arms attached to one edge of said cover, wherein said arms each include a semi-circular open socket for receiving a corresponding axle therein, and a cam surface; and
   a plurality of "U" shaped band-type springs, one arm of each spring being received in one of said cored bosses, and wherein the other arm of each spring presses against the cam surface of the corresponding pivot arm.

6. A vanity mirror assembly comprising:
   a mirror frame, including a plurality of circular pivot axles secured to one side of said frame wherein the central axis of said axles is parallel to the one side of said frame, and a plurality of cored bosses secured to the one side and located coincident with the axles, said mirror frame further including a means for attaching the mirror assembly to a mating part including a plurality of fixed exterior tabs extending out from an exterior mirror frame wall surface;
   a protective cover, including a plurality of pivot arms attached to one edge of said cover, wherein said arms each include a semi-circular open socket for receiving a corresponding axle therein, and a cam surface; and
   a plurality of "U" shaped band-type springs, one arm of each spring being received in one of said cored bosses, and wherein the other arm of each spring presses against the cam surface of the corresponding pivot arm.

* * * * *